United States Patent [19]
Rasmussen et al.

[11] Patent Number: 4,777,217

[45] Date of Patent: * Oct. 11, 1988

[54] METHACRYLAMIDE FUNCTIONAL POLYMERS AND METHOD

[75] Inventors: Jerald K. Rasmussen, Stillwater; Steven M. Heilmann, North St. Paul; Larry R. Krepski, White Bear Lake; Smarajit Mitra, Woodbury, all of Minn.

[73] Assignee: Minnesota Mining and Manufacturing Company, St. Paul, Minn.

[*] Notice: The portion of the term of this patent subsequent to Mar. 31, 2004 has been disclaimed.

[21] Appl. No.: 19,473

[22] Filed: Feb. 26, 1987

[51] Int. Cl.$^4$ ................................................ C08F 8/30
[52] U.S. Cl. .................................... 525/279; 525/283; 525/330.5; 525/391; 527/312

[58] Field of Search ...................... 525/279, 283, 359.3, 525/375, 391; 527/312

[56] References Cited

U.S. PATENT DOCUMENTS

| | | | |
|---|---|---|---|
| 4,304,705 | 12/1981 | Heilmann et al. | 525/279 |
| 4,378,411 | 3/1983 | Heilmann | 525/279 |
| 4,565,857 | 1/1986 | Grant | 527/301 |
| 4,654,233 | 3/1987 | Grant et al. | 427/379 |

*Primary Examiner*—Christopher Henderson
*Attorney, Agent, or Firm*—Donald M. Sell; Lorraine R. Sherman

[57] ABSTRACT

A polymer comprises at least one methacrylamide functional group on the average per polymer molecule, which polymer comprises the reaction product of at least one hydroxy functional polymer with at least one isopropenyl azlactone in the presence of an acidic catalyst, said hydroxy functional polymer having a number average molecular weight above 20,000.

9 Claims, No Drawings

METHACRYLAMIDE FUNCTIONAL POLYMERS AND METHOD

FIELD OF THE INVENTION

This invention relates to methacrylamide functional polymers and to an improved process for preparing them. These polymers find utility, for example, in coatings, films, binders, printing inks, adhesives, and the graphic arts.

DESCRIPTION OF THE PRIOR ART

Energy-sensitive or radiation-curable oligomers and polymers are well known in the art and find uses, for example, in the graphic arts (i.e., in photoresist and photographic applications), in the coatings industries (i.e., as protective coatings for a variety of substrates such as wood, plastics, metals, and glass), as adhesives, or as dental restoratives. For the most part, these oligomers and polymers contain ethylenically-unsaturated functional groups (usually in the form of acrylate or methacrylate esters) at the ends of the polymer chain or pendant to the chain of the polymer. In general, these free radically polymerizable or curable polymers are prepared from polymers having various reactive functional groups and ethylenically unsaturated molecules having complementary reactive functional groups. For example, U.S. Pat. No. 4,304,705 describes radiation-curable polymers which are prepared by the reaction of polymers having pendant azlactone groups with ethylenically-unsaturated nucleophilic compounds (e.g., reaction with hydroxyethyl methacrylate produces polymers having pendant methacrylate ester functional groups).

Due to the wide variety of hydroxy functional oligomers and polymers which are available commercially or can be prepared readily, it is desirable to have efficient methods whereby these polymers can be converted into free radically curable polymers. U.S. Pat. No. 4,565,857 and references cited therein describe previous methods for accomplishing this which involve reaction of the hydroxy functional polymer with an unsaturated monoisocyanate (e.g., such as isocyanatoethyl methacrylate or the 1:1 addition product of a diisocyanate and a hydroxy functional acrylate or methacrylate). These processes have a number of disadvantages. First of all, isocyanates are extremely sensitive to moisture; therefore extreme care must be taken to exclude water from the reaction in order to eliminate detrimental side reactions. In addition, isocyanates are highly toxic materials and require unusual safety precautions for their use. Thus, there is a need in the art to provide a method for preparing free radically curable polymers from hydroxy functional polymers which obviates the use of isocyanates.

The preparation of acrylamide functional oligomers by reaction of a nucleophilic group-functional oligomer with an alkenyl azlactone is taught in assignee's copending patent application U.S. Ser. No. 316,234. When hydroxy functional oligomers are reacted with alkenyl azlactones this art recommends the use of certain Lewis acids as effective catalysts for reactions conducted at or near ambient temperatures (about 25° C.). Although this process does provide oligomers having acrylamide functionality when vinyl azlactones (also referred to as ethenyl azlactones) are reacted with hydroxy functional oligomers, side reactions occur as well leading to an acrylamide functionality substantially less than theoretical. In addition, it has been found that when higher molecular weight hydroxy functional oligomers and polymers are reacted with vinyl azlactones according to the teachings of U.S. Ser. No. 316,234 or with protonic acids as catalysts, chain-extension (often leading to crosslinking and gelation) occurs as a result of these side reactions.

SUMMARY OF THE INVENTION

Briefly, the present invention provides novel polymers and copolymers comprising at least one methacrylamide functional group on the average per polymer molecule and a process for their preparation which involves reaction of hydroxy functional polymers with isopropenyl azlactones in the presence of an acidic catalyst. The use of isopropenyl azlactones as opposed to vinyl azlactones allows reaction to occur without competing side reactions, thus providing the inventive products which have methacrylamide equivalent weights approaching the theoretical value.

The present invention provides free radically curable polymers which have functional groups which are more reactive than the traditional acrylate or methacrylate ester functional polymers.

The methacrylamide functional polymers are prepared from high molecular weight polymers, i.e. in the range above 20,000 to 5,000,000.

In this application:

"alkyl" means the monovalent group remaining after removal of a hydrogen atom from a linear or branched chain hydrocarbon having 1 to 14 carbon atoms;

"aryl" means the monovalent group remaining after removal of one hydrogen atom from an aromatic or heteroaromatic compound which can consist of one ring or two fused or catenated rings having 5 to 12 ring atoms which can include up to three heteroatoms selected from S, N, and O. The carbon atoms can be substituted by up to three halogen atoms, and groups selected from $C_1$–$C_4$ alkyl, $C_1$–$C_4$ alkoxy, N,N-di($C_1$–$C_4$ alkyl)amino, nitro, cyano, and $C_1$–$C_4$ alkyl carboxylic ester groups, and "arenyl" means the monovalent groups remaining after removal of a hydrogen atom from the alkyl portion of a hydrocarbon containing both alkyl and aryl groups having 6 to 26 carbon and up to 3 S, N, and O heteroatoms.

DETAILED DESCRIPTION

This invention provides polymers and copolymers (collectively referred to hereinafter as "polymers") comprising at least one methacrylamide functional group per polymer molecule, said polymers having the general Formula I:

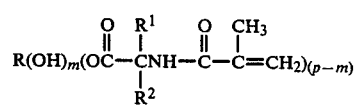

wherein
$R^1$ and $R^2$ independently represent an alkyl group of 1 to 14 carbon atoms, a cycloalkyl group of 3 to 14 carbon atoms, an aryl group of 5 to 12 ring atoms, or an arenyl group of 6 to 26 carbon and heteroatoms, or $R^1$ and $R^2$ taken together with the carbon atom to which they are joined form a carbocyclic ring of 4 to 12 ring atoms; preferred $R^1$ and $R^2$ groups are $CH_3$, $C_2H_5$, $C_3H_7$, $C_4H_9$, $C_5H_{11}$, $C_6H_{13}$, $C_6H_5$, $C_6H_5CH_2$, $C_6H_5CH_2CH_2$, and $C_{12}H_{25}$;

R represents an organic polymeric group containing at least one of aliphatic, aromatic, and arenyl groups which optionally can contain N, O, and S heteroatoms, and having a number average molecular weight greater than 20,000, preferably in the range of greater than 20,000 to 5,000,000, more preferably greater than 25,000, and most preferably in the range of 25,000 to 5,000,000;

m is an integer from 0 to p−1; and p is the valence of the polymer and is an integer having a value of at least one and representing the number of hydroxyl groups present in polymer $R(OH)_p$.

The novel polymers of the invention are non-chain-extended and uncrosslinked.

The novel polymers of Formula I of the invention are prepared by an equally novel process. This process involves the reaction of a hydroxy functional polymer of Formula II:

$$R(OH)_p \qquad \text{II}$$

wherein R and p are defined above, with 0.01 to 1.0 equivalent, based upon the hydroxy equivalent weight of the polymer of Formula II, of an isopropenyl azlactone of Formula III:

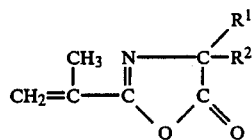

wherein $R^1$ and $R^2$ are defined above, in the presence of an acidic catalyst.

The hydroxy functional polymers of Formula II which are useful in the practice of the invention may vary widely in terms of chemical composition and molecular weight provided that at least one hydroxy group per polymer chain is present for reaction with the azlactone of Formula III. Hydroxy functional polymers are well known in the art, and include polymers which are prepared by both step-growth and chain-growth polymerizations. Representative polymers include:

(a) polymers and copolymers of hydroxy functional vinyl monomers such as 2-hydroxyethyl acrylate and methacrylate, hydroxypropyl acrylate, 2-hydroxyethyl acrylamide, 2-hydroxyethyl maleimide, 4-hydroxybutyl vinyl ether, glycerol monoacrylate or methacrylate, pentaerythritol monoacrylate, and diethyleneglycol monoacrylate; these polymers include homopolymers of the hydroxy functional vinyl monomers as well as copolymers derived from copolymerization of the hydroxy functional vinyl monomers with one or more of a variety of comonomers. Suitable comonomers include essentially any free radically polymerizable ethylenically unsaturated monomers, examples of which include: the vinyl aromatic monomers such as styrene, α-methylstyrene, 2- and 4-vinylpyridine, and the like; α,β-unsaturated carboxylic acids such as acrylic acid, methacrylic acid, itaconic acid, maleic acid, fumaric acid, crotonic acid, and the like; α,β-unsaturated carboxylic acid derivatives such as methyl methacrylate, butyl methacrylate, 2-ethylhexyl methacrylate, ethyl acrylate, butyl acrylate, iso-octyl acrylate, octadecyl acrylate, cyclohexyl acrylate, tetrahydrofurfuryl methacrylate, phenyl acrylate, phenethyl acrylate, benzyl methacrylate, β-cyanoethyl acrylate, maleic anhydride, diethyl itaconate, acrylamide, methacrylonitrile, N-butylacrylamide and the like; vinyl esters of carboxylic acids such as vinyl acetate, vinyl 2-ethylhexanoate and the like; vinyl halides such as vinyl chloride, vinylidene chloride and the like; vinyl alkyl ethers such as methyl vinyl ether, 2-ethylhexyl vinyl ether, butyl vinyl ether and the like; olefins such as ethylene; N-vinyl compounds such as N-vinylpyrrolidone, N-vinylcarbazole and the like; vinyl ketones such as methyl vinyl ketone and the like; and vinyl aldehydes such as acrolein, methacrolein and the like;

(b) hydroxy functional polymers and copolymers derived from vinyl acetate, vinyl trifluoroacetate or other vinyl esters, such as vinyl acetate/vinyl alcohol copolymers, polyvinyl alcohol, polyvinyl acetal, polyvinyl butryal, and other hydrolyzed or partially hydrolyzed vinyl acetate copolymers;

(c) hydroxy functional cellulose and modified cellulose polymers such as cellulose acetate, cellulose nitrate, cellulose acetate propionate, cellulose acetate butyrate, cellulose acetate phthalate, hydroxypropyl cellulose, hydroxyethyl cellulose, benzyl cellulose, methyl cellulose, and ethyl cellulose; and (d) phenoxy polymers such as those prepared by step-growth polymerization of bisphenol A diglycidyl ether or other diepoxides with bisphenols.

The isopropenyl azlactones of Formula III are also well known in the art, and may be prepared as described in K. Huebner, et al., *Angew. Makromol. Chem.*, 1970, 11, 109. Examples of suitable isopropenyl azlactones include:

2-isopropenyl-4,4-dimethyl-1,3-oxazolin-5-one,
2-isopropenyl-4-ethyl-4-methyl-1,3-oxazolin-5-one,
2-isopropenyl-4-methyl-4-butyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one, also named:
2-isopropenyl-3-oxa-1-aza[4,5]spirodec-1-ene-4-one,
2-isopropenyl-4,4-tetramethylene-1,3-oxazolin-5-one also named:
2-isopropenyl-3-oxa-1-aza[4,4]spironon-1-ene-4-one.

In assignee's copending patent application U.S. Ser. No. 316,234, the reaction of hydroxy functional oligomers with 2-ethenyl-4,4-dimethyl-1,3-oxazolin-5-one, a vinyl azlactone, in the presence of the Lewis acid aluminum chloride was exemplified. Monitoring the reaction by infrared spectroscopy indicated the formation of acrylamide functional oligomers. Bronsted acids were described as being inefficient catalysts. This conclusion was based upon the fact that infrared analysis of reactions utilizing this type of catalyst indicated a lack of complete disappearance of the azlactone carbonyl absorption peak. We have now discovered that the reaction of alcohols with vinyl azlactones such as 2-ethenyl-4,4-dimethyl-1,3-oxazolin-5-one (2-vinyl-4,4-dimethylazlactone) in the presence of either Bronsted or Lewis acids results in side reactions as well as the ring-opening reaction which produces acrylamides. The reactions are summarized in Scheme I for the simple alcohol, phenethyl alcohol. Reaction occurs via one of two pathways, path a in which normal ring-opening produces the acrylamide A, and path b in which Michael addition of the alcohol across the vinyl group occurs to produce a new azlactone B. Further ring-opening of B can occur to produce bisadduct C. Thus, one obtains a mixture of an acrylamide functional adduct A and other adducts which do not have acrylamide functionality. Furthermore, the side reactions to form B and C are not just minor reaction pathways; with phenethyl alcohol, reaction pathways a and b proceed with approximately equal frequency.

roacetic acid, acetic acid, phenylphosphonic acid, and ethylphosphinic acid. Anhydrous acids are preferred, as the potential for hydrolysis of the azlactone is minimized. Also, the rate of the reaction between the polymer of Formula II and the azlactone of Formual III is dependent upon the acid strength, or pKa, with stronger acids being the most effective. Thus, to achieve

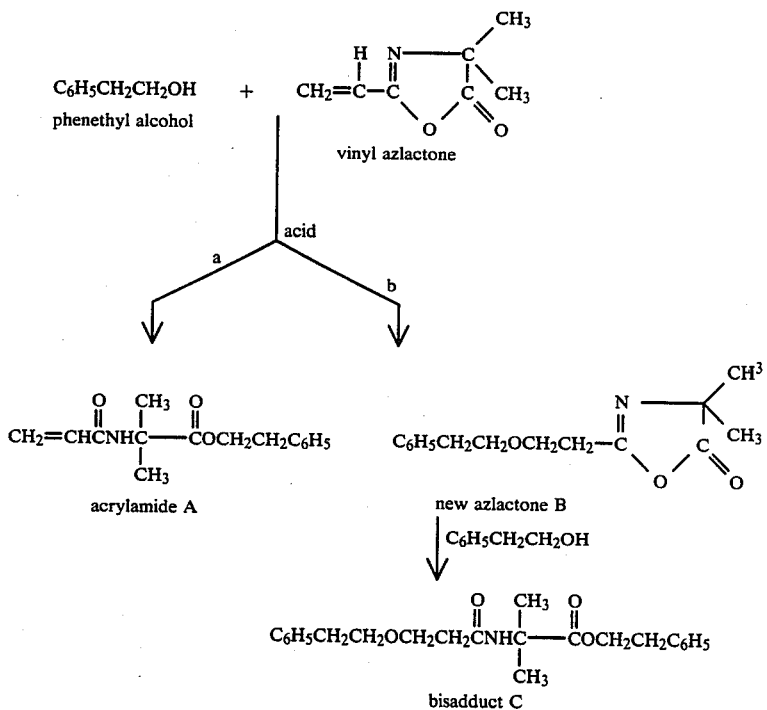

Scheme I

When one reacts a vinyl azlactone with a diol, however, a slightly different situation arises. In this case, the bisadduct corresponding to C is still a diol, albeit of approximately twice the molecular weight of the starting diol. This bisadduct can now undergo reaction via path a to produce an acrylamide functional material. Thus, with oligomeric or polymeric diols, acrylamide functional polymers are produced; however, chain extension has also occured and the final adducts have less acrylamide functionality than is theoretically possible, i.e, the acrylamide equivalent weight is much higher than theoretical. Finally, if one reacts polyols having a hydroxy functionality of 3 or greater, an additional complication can arise. If the functionality is fairly low or the molecular weight of the oligomer is low, reaction will occur in a manner similar to that found with the diol. However, as is obvious to one skilled in the art, as the functionality and/or the molecular weight of the polymer increases, reactions according to path b can lead to crosslinking and insolubilization of the product. We have now quite unexpectedly discovered that replacing the vinyl azlactone in Scheme I with an isopropenyl azlactone (Formula III) results in reaction via path a essentially exclusively, thus producing methacrylamide functional polymers without complications due to chain extension or crosslinking.

The acidic catalysts of use in the invention may be of either the Bronsted or Lewis type. Examples of useful Bronsted acids include sulfuric acid, trifluoroacetic acid, trichloroacetic acid, toluenesulfonic acid, dichlouseful reaction rates it has been found to be preferrable to use an acid having a pKa, as measured in aqueous solution, of less than about 2.5, and more preferably of about 0 or less. Examples of useful Lewis acids include boron trifluoride, boron trifluoride etherate, aluminum chloride, titanium tetrachloride, stannic chloride, and zirconium tetrachloride. From about 0.05 to about 10 mole percent, preferably 0.5 to 5 mole percent, of catalyst based upon hydroxy equivalent weight of the polymer of Formula II has been found to be effective for the purpose of the invention.

The process of the invention is conveniently carried out in the presence or absence of an inert organic solvent or diluent, inert being defined as unreactive with either the polymer II or the azlactone III under the process conditions. In general, any solvent or diluent which does not contain hydroxyl, primary or secondary amine, or mercaptan functional groups can be utilized so long as the polymer is soluble in it. Suitable solvents include esters such as ethyl acetate, isopropyl acetate, and cellosolve acetate; ketones such as acetone, methyl ethyl ketone, methyl isobutyl ketone, and cyclohexanone; ethers such as diethyl ether, tetrahydrofuran, methyl t-butyl ether, glyme, diglyme, and dioxane; chlorinated solvents such as dichloromethane, chloroform, dichloroethane, and carbon tetrachloride; aromatic solvents such as benzene, toluene, chlorobenzene, nitrobenzene, and xylene; aliphatic hydrocarbons such as pentane, hexane, heptane, and cyclohexane; and others such as acetonitrile, dimethylformamide, dimethylsulfoxide, dimethylacetamide, N-methylpyrrolidone, and nitromethane. It is also within the scope of the invention to use a combination of two or more of these solvents.

An important feature of the current process is that many of the novel polymers of Formula I can be prepared conveniently at room temperature (22° C. to 25° C.). This low temperature minimizes the possibility of premature free radical polymerization and crosslinking of the polymers. It may be desired, however, with certain less reactive polymers of Formula II or azlactones of Formula III, or when weaker acidic catalysts are used, to conduct the process reaction at elevated temperatures of up to about 100° C. to 120° C. or so. In these instances, it may be advantageous to add a free radical inhibitor, such as a hindered phenol in an effective amount (e.g., 0.00005 to 1.0 weight percent based on polymer) to the reaction mixture.

As should be obvious to one skilled in the art, the reaction time required to convert polymers of Formula II into the novel polymers of Formula I of the invention will vary widely. Reaction times will depend upon several factors, including the nature of the polymer, the $R^1$ and $R^2$ substituents of the azlactone, the type and strength of the catalyst, the amount of catalyst, the concentration of reactants, and the temperature of the reaction. The progress of the reaction, however, can conveniently be monitored by infrared spectroscopy by following the disappearance of the carbonyl absorption of the azlactone at about 1800 cm$^{-1}$ (about 5.5 micrometers). The absence of competing side reactions and estimation of methacrylamide equivalent weights may be determined conveniently by $^1$H-NMR analysis.

It is considered to be within the scope of the invention to prepare the novel polymers of Formula I of the invention by reacting all of the hydroxy groups present in polymer of Formula II with the azlactone of Formula III, or to react only a portion of the hydroxy groups which are present so long as at least one hydroxy group, on the average, per polymer molecule has been converted to a methacrylamide group. Preferably at least 5 percent, more preferably at least 10 percent, of the available hydroxy groups are reacted.

Objects and advantages of this invention are further illustrated by the following examples, but the particular materials and amounts thereof recited in these examples, as well as other conditions and details, should not be construed to unduly limit this invention.

EXAMPLE 1

A copolymer* of vinyl chloride (78 molar parts), hydroxypropyl acrylate (15 parts), and butyl acrylate (7 parts) (150 g of copolymer, m.wt. approximately 28,000, hydroxy equivalent weight 850, 0.176 equivalents) was dissolved in methyl ethyl ketone (545 mL). To this solution was added 0.1 g trifluoroacetic acid (2 Mol % based on hydroxy equiv. wt.) followed by 4,4-dimethyl-2-isopropenylazlactone, IDM, (0.044 Mol, 25 Mol % based on hydroxy equiv. wt.). The reaction mixture was heated at 57° C. for 2 hrs, then allowed to cool to ambient temperature. Spectroscopic analysis of the reaction mixture and of polymer isolated by precipitation into methanol verified essentially exclusive formation of the methacrylamide functional polymer.

*copolymer (Vinnol TM, Wacker-Chemie GmbH, Munich, W. Germany)

EXAMPLE 2

The copolymer (Vinnol) of Example 1 (20.11 g, 0.024 equiv.) and IDM (3.62g, 0.024 Mol) were dissolved in ethyl acetate (71.2 g), then trifluoroacetic acid (0.05 g, 1.8 Mol was added. The mixture was heated at 40° C. for 5 days. Additional trifluoracetic acid (0.15 g) was added, and heating was continued for 8 more days at 55° C. Throughout this time period, the reaction mixture remained fluid. Isolation of the polymer was accomplished by precipitation into methanol. Spectroscopic analysis verified the anticipated methacrylamide functionality.

This procedure can be repeated except that IDM can be replaced by 2-isopropenyl-4-ethyl-4-methyl-1,3-oxazolin-5-one or by 2-isopropenyl-4,4-pentamethylene-1,3-oxazolin-5-one.

EXAMPLES 3–7 AND COMPARATIVE EXAMPLES 8–13

Solutions of the copolymer (Vinnol) of Example 1 (22% solids in ethyl acetate) were mixed with various catalysts, then IDM (1 equiv.) was added to the resultant solutions at room temperature. Results are listed in Table I.

TABLE I

| | Reaction of copolymer (Vinnol) with IDM | | |
|---|---|---|---|
| Example | Catalyst (Mol %$^a$) | Conditions | Result |
| 3 | p-toluenesulfonic acid (1.0) | 12 hr, 60° C. | b |
| 4 | sulfuric acid (8.6) | 72 hr, 22° C. | b |
| 5 | BF$_3$etherate (4.2) | 72 hr, 22° C. | b |
| 6 | SnCl$_4$ (5.8) | 72 hr, 22° C. | b |
| 7 | AlCl$_3$ | 72 hr, 22° C. | b |
| Comparative 8 | ethanesulfonic acid (1.6) | 72 hr, 22° C. | c |
| Comparative 9 | methanesulfonic acid (18.5) | 3.5 hr, 22° C. | c |
| Comparative 10 | ZnCl$_2$ (7.6) | 22 hr, 22° C.; 72 hr, 60° C. | c |
| Comparative 11 | SnCl$_2$ (8.2) | 22 hr, 22° C.; 72 hr, 60° C. | c |
| Comparative 12 | dibutyltin dilaurate (2.4) | 22 hr, 22° C.; 72 hr, 60° C. | d |
| Comparative 13 | tetrabutyl titanate (2.0) | 88 hr, 60° C. | d |

$^a$based on hydroxy equivalent weight
$^b$clean conversion to methacrylamide polymer
$^c$crosslinked polymer formed
$^d$no discernible reaction $^a$based on hydroxy equivalent weight $^b$clean conversion to methacrylamide polymer $^c$crosslinked polymer formed $^d$no discernible reaction The data of Table I show that certain Bronsted and Lewis acids provide clean conversion to the methacrylamide polymers in the instant invention.

EXAMPLES 14–16 (COMPARATIVE)

Reaction mixtures were prepared as in Example 4 substituting 4,4-dimethyl-2-vinylazlactone (VDM) (0.5 equiv.) for IDM and using various catalysts;

EXAMPLE 14 (COMPARATIVE)

Ethanesuloonic acid (2 Mol %) - gelation occurred within 5 min at 22° C.

EXAMPLE 15 (COMPARATIVE)

Aluminum Chloride (5 Mol %) - gelation occurred after 16 hr at 22° C.

EXAMPLE 16 (COMPARATIVE)

Trifluoroacetic acid (5 Mol %) - gelation occurred after 1.5 hr at 22° C.

EXAMPLE 17 (COMPARATIVE)

Reaction mixtures were prepared as in Example 1 substituting VDM for IDM. One sample was allowed to react at 22° C. while another was heated at 55° C. for a total of 66.5 hr. Infrared spectroscopic analysis indicated complete reaction of the VDM. The resultant polymers were isolated by precipitation into methanol. NMR spectroscopic analysis of the polymers failed to detect the presence of acrylamide double bond functionality, an indication that predominant chain extension had occurred.

EXAMPLE 18

To a solution of 250mg of 93:7 (Mol/Mol) vinyl acetate/vinyl alcohol copolymer (m. wt. approximately 25,000) in methyl ethyl ketone (1.75 g) was added IDM (55mg) and trifluoroacetic acid (9 mg). The mixture was heated at 63° C. for 24 hrs. An additional 190mg copolymer in 1.3 g solvent was added and the reaction was completed by heating 3 hrs. at 63° C. to give the methacrylamide functional polymer.

EXAMPLE 19

To a solution of the vinyl acetate/vinyl alcohol copolymer of Example 18 (180 mg) in ethyl acetate (1.82 g) was added IDM (56 mg) and trifluoroacetic acid (11 mg). The mixture was heated at 63° C. for 23 hrs. An additional 270 mg copolymer in 2.73 ethyl acetate was added and reaction was completed by heating for 3 hrs at 63° C. to give the methacrylamide functional polymer.

EXAMPLE 20

Polyvinyl butyral (Butvar B-76 ™, Monsanto Chemical Co., St. Louis, MO) (m. wt. approximately 50,000, hydroxy equiv. wt.=370, 1.96 g) was dissolved in methyl ethyl ketone (15 mL). To this solution was added IDM (811mg) and trifluoroacetic acid (21 mg). The mixture was heated at 40° C. for 17 hrs, then at 46° C. for 6.5 hrs, and finally at 58° for 64 hrs to give the methacrylamide functional polymer.

EXAMPLE 21 (COMPARATIVE)

A reaction conducted similarly to Example 20 substituting VDM for IDM resulted in crosslinking.

EXAMPLE 22

Polyvinyl formal (Formvar 15-95E ™, m. wt. approximately 30,000 hydroxy equiv. wt.=800, 2.00 g, Monsanto, St. Louis, MO) was dissolved in tetrahydrofuran (15 mL). To this solution was added IDM (382 mg) and trifluoroacetic acid (35 mg). The mixture was heated at 40° C. for 24 hrs, 46° C. for 7 hrs, and finally 58° C. for 64 hrs to give the methacrylamide functional polymer.

EXAMPLE 23

A methyl ethyl ketone solution (25.7% solids) of nitrocellulose (hydroxy equiv. wt.=350) was mixed with trifluoroacetic acid (4 Mol %) followed by IDM (0.5 equiv). The resulting solution was heated at 75° C. for 4.5 days, then precipitated into diethylether to isolate the resultant polymer. Spectroscopic analysis confirmed formation of the methacrylamide functional polymer.

EXAMPLE 24 (COMPARATIVE)

Repetition of Example 9 substituting VDM for IDM and conducting the reaction at 55° C. resulted in gellation within 1 hr.

EXAMPLE 25

The copolymer (Vinnol) solution of Example 2 was mixed with 2-isopropenyl-4,4-diphenylazlactone (1 equiv. based on hydroxy equiv. wt.) and toluene sulfonic acid (5.2 mole % based on hydroxy equiv. wt.). The mixture was heated at 65° C. for 18 hrs., then the polymer was isolated by precipitation into methanol. Spectral characterization verified the methacrylamide functionality.

EXAMPLE 26

Equivalent amounts of phenoxy resin (available from Union Carbide Corp., under the tradename PKHJ ™) and IDM were reacted in dimethylformamide solution (20% solids) in the presence of 6 mole % toluenesulfonic acid for 2 days at 70° C. to give the methacrylamide functional resin.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymer having the formula

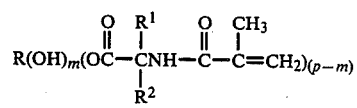

wherein $R^1$ and $R^2$ independently represent an alkyl group of 1 to 14 carbon atoms, a cycloalkyl group of 3 to 14 carbon atoms, an aryl group of 5 to 12 ring atoms, or an arenyl group of 6 to 26 carbon and heteroatoms, or $R^1$ and $R^2$ taken together with the carbon atom to which they are joined form a carbocyclic ring of 4 to 12 ring atoms;

R is an organic polymeric group containing at least one of aliphatic, aromatic, and arenyl groups, and having a number average molecular weight greater than 20,000;

m is an integer from 0 to p−1; and p is the valence of the polymer and is an integer having a value of at least one and representing the number of hydroxyl groups present in polymer $R(OH)_p$, said polymer being essentially free of chain extension and crosslinking.

2. The polymer according to claim 1 comprising at least one methacrylamide functional group on the average per polymer molecule, which polymer comprises the reaction product of at least one hydroxy functional polymer with at least one isopropenyl azlactone in the presence of an acidic catalyst.

3. The polymer according to claim 1 wherein $R^1$ and $R^2$ are independently selected from the group consisting of $CH_3$, $C_2H_5$, $C_3H_7$, $C_4H_9$, $C_5H_{11}$, $C_6H_{13}$, $C_6H_5$, $C_6H_5CH_2$, $C_6H_5CH_2CH_2$, and $C_{12}H_{25}$.

4. The polymer according to claim 1 wherein R is the organic group of a polymer or copolymer of a hydroxy functional vinyl monomer, a polymer or copolymer of a hydroxy functional vinyl ester, of a hydroxy functional cellulose or cellulose polymer, or a hydroxy functional phenoxy polymer.

5. The polymer according to claim 4 wherein said hydroxy functional vinyl monomer is 2-hydroxyethyl acrylate or methacrylate, hydroxypropyl acrylate, 2-hydroxyethyl acrylamide, 2-hydroxyethyl maleimide, 4-hydroxybutyl vinyl ether, glycerol monoacrylate or methacrylate, pentaerythritol monoacrylate, or diethyleneglycol monoacrylate.

6. The polymer according to claim 1 wherein R is the organic group of a polymer or copolymer derived from vinyl acetate or vinyl trifluoroacetate.

7. The polymer according to claim 6 wherein said polymer or copolymer is vinyl acetate/vinyl alcohol copolymer, polyvinyl alcohol, polyvinyl acetal, or polyvinyl butyral.

8. The polymer according to claim 6 wherein said copolymer is a hydrolyzed or partially hydrolyzed vinyl acetate or vinyl trifluoroacetate copolymer.

9. The polymer according to claim 1 wherein R further comprises at least one of N, O, and S heteroatoms.

* * * * *